E. H. HARVEY.
BOUQUET CARRIER.
APPLICATION FILED OCT. 23, 1919.
1,436,036.
Patented Nov. 21, 1922.
Fig. 1.
Fig. 2.
Fig. 3.
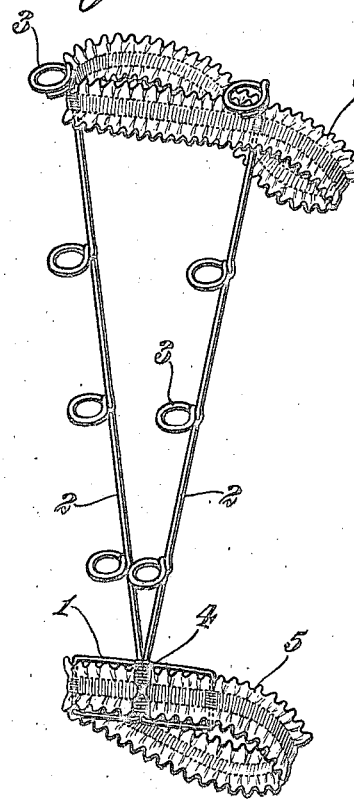
Inventor:
EDWARD H. HARVEY,
By John H. Bruninga
His Attorney.

Patented Nov. 21, 1922.

1,436,036

UNITED STATES PATENT OFFICE.

EDWARD H. HARVEY, OF ST. LOUIS, MISSOURI, ASSIGNOR TO FRANK X. GORLEY, OF ST. LOUIS, MISSOURI.

BOUQUET CARRIER.

Application filed October 23, 1919. Serial No. 332,833.

*To all whom it may concern:*

Be it known that I, EDWARD H. HARVEY, a citizen of the United States, and residing at St. Louis, Missouri, have invented the new and useful Improvement in Bouquet Carriers, of which the following is a specification.

This invention relates to a carrier for floral decorations, adapted more particularly to be worn on the person.

Bouquets when worn as corsages are liable to become crushed on account of being in exposed positions. The result is that an expensive bouquet may, after having been worn a very short time, be damaged if not destroyed.

One of the objects of this invention, therefore, is to provide a bouquet carrier which is so constructed as to enable it to be worn in such a manner as to avoid exposure to damage but still present an artistic appearance.

Another object is to provide a bouquet carrier which is so constructed as to be readily mounted on the limb or arm of the wearer.

Another object is to provide a bouquet carrier which can be readily loaded with floral decorations, which is simple in construction, artistic in appearance and economical to manufacture.

Further objects will appear from the detail description taken in connection with the accompanying drawing in which:

Figure 1 is a perspective view of a bouquet carrier embodying this invention;

Figure 2 is a view showing the carrier loaded with floral decorations; and

Figure 3 is a view showing the application of the bouquet carrier to the arm of the wearer.

Referring to the accompanying drawing, the bouquet carrier embodying this invention comprises a frame of wire or the like, preferably of fabric covered wire. The wire is bent to form a loop 1 and the free ends are bent back to close the loop and diverge to form branches 2. The branches are formed to provide loops 3 arranged therealong and extending outwardly at right angles to the branches as shown in Figure 1. Inside of the loop 1 the branches are fastened together by fine wire as shown at 4 in order to produce a somewhat rigid frame. Bands 5 and 6 are secured to the opposite ends of the frame, these bands being of elastic fabric of any suitable decorative design. They are secured to the wire frame in any suitable manner as by passing the wire through the fabric or by sewing the bands to the wire. This leaves a free stem at 4 for a purpose hereinafter to be described.

The loops 3 are adapted to receive the stems of floral elements 7 as shown in Figure 2 and the frame can, therefore, be loaded with any suitable floral decorations so as to present any suitable design. After the frame is so loaded, a ribbon can be passed around the stem 4 and around the projecting stems of the floral elements and this ribbon can be tied to form a suitable bow 8. After the frame has thus been loaded, it can, together with its floral decorations, be placed on the arm of the wearer so as to lie therealong as shown in Figure 3, the elastic bands or armlets 5 and 6 providing elastic means for securing the bouquet on the arm. It will be noted that the armlet 6 is of larger size than the armlet 5 to correspond to the taper of the arm of the wearer.

It will, therefore, be seen that the invention accomplishes its objects. A bouquet carrier is provided whereby a bouquet may be placed on the forearm of a wearer so as to present a pleasing and artistic appearance. This bouquet is, therefore, in such a position that it is and can readily be protected so as to avoid damage to the floral decorations. On account of the spreading construction of the frame, the bouquet can be given a spreading form so as to present an artistic appearance. The carrier can be readily placed on or removed from the arm and can be used over and over again.

It is obvious that various changes may be made in the details of construction without departing from the spirit of this invention; it is, therefore, to be noted that this invention is not to be limited to the specific construction shown and described.

Having thus described the invention, what is claimed is:

1. A bouquet displaying device, comprising, a frame having stem-receiving loops, and armlet means for mounting said frame, said frame being adapted to receive and display floral elements in the form of a bouquet on the arm of the wearer.

2. A bouquet displaying device, comprising, a spreading frame having stem-receiving loops, and armlet means for mounting said frame, said frame being adapted to receive and display floral elements in the form of a bouquet on the arm of the wearer.

In testimony whereof I affix my signature this 14th day of July, 1919.

EDWARD H. HARVEY.